June 26, 1956     D. J. PYE     2,752,402
OXYCHLORINATION OF HYDROCARBONS
Filed Oct. 6, 1950
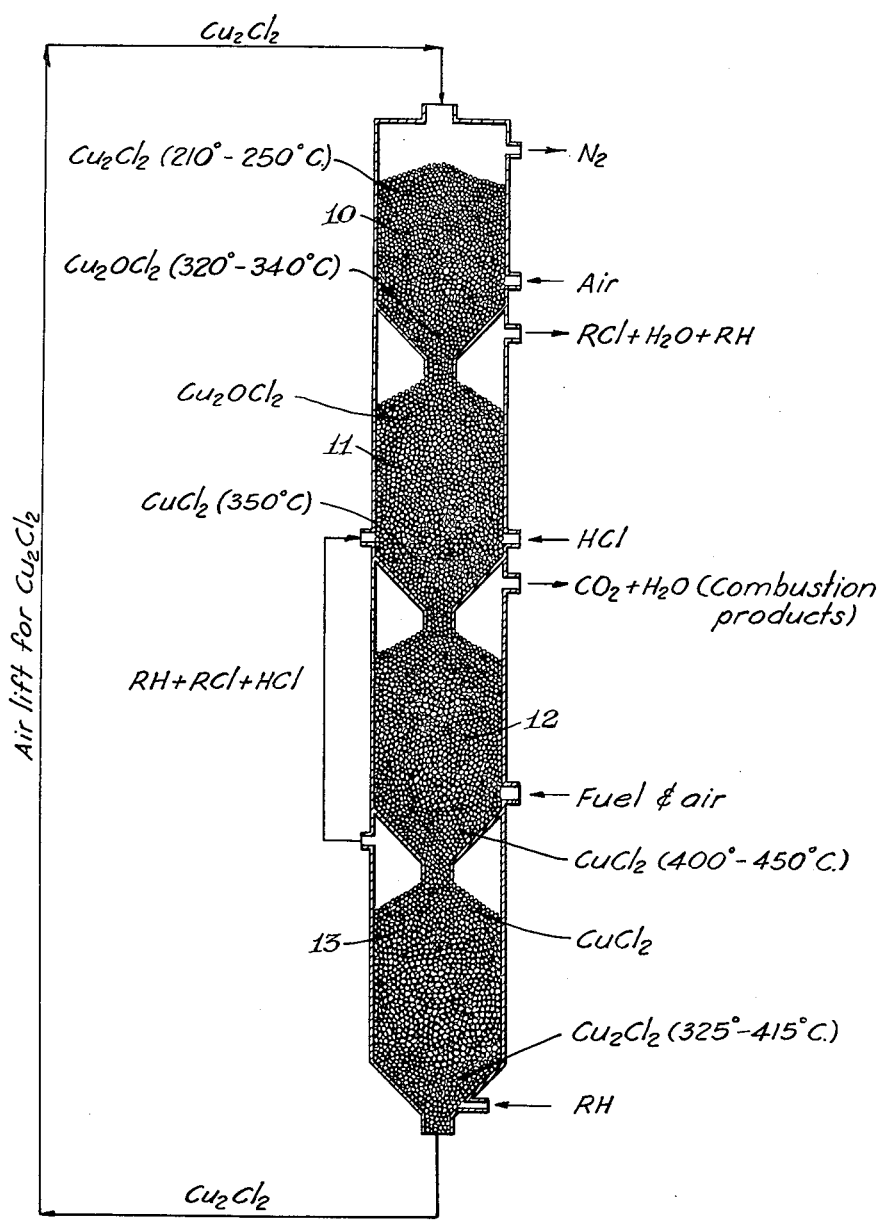
INVENTOR.
David J. Pye
BY
*Griswold & Burdick*
ATTORNEYS United States Patent Office 2,752,402
Patented June 26, 1956

2,752,402

OXYCHLORINATION OF HYDROCARBONS

David J. Pye, Concord, Calif., assignor to The Dow Chemical Company, Midland, Mich., a corporation of Delaware Application October 6, 1950, Serial No. 188,676

7 Claims. (Cl. 260—659)

This invention relates to a method and apparatus for the continuous oxychlorination of hydrocarbons. It relates as well to the oxychlorination of the volatile and less than fully chlorinated substitution products of such hydrocarbons.

The term "oxychlorination" is used herein as elsewhere in the art to refer to a reaction in which the source of chlorine employed for the chlorination reaction is gaseous hydrogen chloride which is made to give up its chlorine in useful form through a well known series of reactions involving oxygen and copper chlorides or the chlorides of other metals of variable valence. Numerous such reactions for the generation of chlorine from hydrogen chloride have long been known. The Deacon Process, for example, was proposed for the oxidation of hydrogen chloride with air over a fixed body of copper chlorides which functioned catalytically, to produce chlorine. One disadvantage of the Deacon Process, when applied to the chlorination of hydrocarbons, as well as when used merely for the production of chlorine, arose from the decreasing effectiveness of the catalyst mass which had to be replaced and regenerated. Several improvements and modifications have been made in the original Deacon Process and many of these have been applied to the oxychlorination of such diverse hydrocarbons and hydrocarbon derivatives as methane, ethane, ethylene, some of the chloroethylenes and benzene. The trend has been toward the use of a fluidized reaction mass comprising copper chlorides supported on finely divided and presumably inert carriers. Such a process is typified by the teachings of British Patent No. 587,969.

It must be recognized, however, that a fluidized reaction mass is necessarily of uniform composition throughout each reaction zone, and that the use of such a mass, where the reagents normally pass through several stages, results necessarily in average or compromise conditions rather than optimum reaction conditions. If it is considered that the copper chlorides employed in an oxychlorination of hydrocarbons are true reagents rather than catalysts, it becomes apparent that close attention must be paid to provide the optimum reaction conditions for the preparation in turn of each of the various chlorides involved in the following typical reactions:

$$Cu_2Cl_2 + \tfrac{1}{2} O_2 \rightarrow CuO \cdot CuCl_2 \qquad (1)$$
$$CuO \cdot CuCl_2 + 2HCl \rightarrow 2CuCl_2 + H_2O \qquad (2)$$
$$2CuCl_2 + RH \rightarrow RCl + Cu_2Cl_2 + HCl \qquad (3)$$

It is recognized that each of these reactions has different thermal requirements and characteristics from each of the others. Despite such recognition, proposals have been made to combine Reactions 1 and 2 above, giving rise to the following equation:

$$Cu_2Cl_2 + \tfrac{1}{2} O_2 + 2HCl \rightarrow 2CuCl_2 + H_2O \qquad (4)$$

Similarly it has been proposed to combine, in a single reaction zone, Equations 2 and 3 above, the result of which is $$CuO \cdot CuCl_2 + HCl + RH \rightarrow Cu_2Cl_2 + RCl + H_2O \qquad (5)$$

The disadvantage of a system employing Equation 4 as its sole source of cupric chloride resides largely in the dilution effect which the mixture of oxygen and hydrogen chloride exert upon one another. The desirable mass action, either for the formation of cupric oxychloride as in Equation 1, or for the production of cupric chloride as in Equation 2, cannot occur. Many of the chlorinated hydrocarbons, which it is desired to produce by an oxychlorination procedure, are readily hydrolyzed by water at high temperatures while the same compounds, or the hydrocarbons from which they are made, are oxidized to carbon dioxide by such agents as cupric oxychloride or oxygen at the high temperatures needed for chlorination. For these reasons the combination represented by Equation 5 is disadvantageous, if it is the sole reaction for the chlorination of the hydrocarbon.

To carry out the reaction represented by Equation 3, there should be present a maximum of cupric chloride, to promote the chlorination, and a minimum of cupric oxychloride, to prevent undesired oxidation. At the same time, Reaction 2 requires that a maximum of cupric oxychloride be present to insure high efficiency in converting hydrogen chloride to chlorine in the form of the chlorination agent, cupric chloride. These two requirements are inconsistent with one another if it is attempted to carry out both reactions in a single reaction zone, and optimum conditions for both reactions are unobtainable in a well mixed solid phase such as is present in a fluidized reaction system. To prevent the cupric chloride from losing chlorine, as such, to the effluent gases, the reaction mass in the oxidizing section of an oxychlorination system should contain a high concentration of cuprous chloride which can absorb any chlorine that is liberated. Since cuprous chloride is useless as a chlorinating agent, any attempt to transfer a reaction mass containing large amounts of this material from the oxidation section to the chlorination section of the system would defeat the ultimate purpose. It is apparent that it is similarly impractical to transfer high values of cupric chloride from the oxidation bed to the chlorination bed, since this will result in loss of chlorine during oxidation.

It is desired to avoid the unsatisfactory and compromise conditions prevailing in the reaction zones described in the prior art. To this end, it is an object of the present invention to provide a method whereby hydrocarbons and their partially chlorinated substitution products may be chlorinated efficiently in the presence of reaction masses comprising the chlorides of copper, and under conditions to minimize hydrolysis of the product, oxidation of the hydrocarbon, and loss of chlorine values. A related object is to provide such a method in which the degree of conversion of hydrogen chloride is so great, in a single pass through the reaction system, that recycling of chlorine values is unnecessary. Related objects may appear hereinafter.

The present invention is based upon the discovery that the foregoing objects are attained and that the disadvantages inherent in the prior art processes are avoided by a particular type of controlled reaction between the hydrocarbon and the chlorides of copper under such conditions that each stage in the reaction is effected at its optimum temperature and with the optimum ratio of reagents.

The process of the present invention will be described and may be understood by referring to the accompanying drawing which is a flow diagram showing the reaction system preferred for use in the invention.

The apparatus employed in carrying out the method of the invention consists essentially of four chambers, in series, through which the solid reaction mass flows, by gravity, countercurrent to the gaseous or vaporized reagents. Referring to the drawing, cuprous chloride, in the form of an impregnant on a siliceous carrier, is fed into the top of the uppermost chamber 10 wherein it is converted, by the action of an excess of air, to cupric oxychloride. This is an exothermic reaction, and under preferred conditions for many common chlorination reactions the material entering the insulated chamber 10 is at a temperature not significantly over 300° C. and preferably near 210° to 250° C., while the oxidized solid reaction mass leaves chamber 10 at a somewhat higher temperature, preferably near 330° C. The suggested temperatures are high enough for the effective production of cupric oxychloride, yet are low enough to avoid difficulty in the succeeding steps of the process. As the solid reaction mass moves downward, it enters chamber 11 where it meets a mixture of hydrocarbon, chlorinated hydrocarbon and hydrogen chloride produced at a lower level in the tower. All hydrogen chloride is removed from that mixture by reaction with the cupric oxychloride. Enough additional hydrogen chloride is fed into chamber 11 near the bottom thereof to convert substantially all remaining cupric oxychloride to cupric chloride. (The chlorinated products, together with the water formed in chamber 11, as well as any remaining traces of hydrocarbon pass out of the system from an upper level in chamber 11 and may be condensed and separated in suitable standard equipment.) The rate of feed of hydrogen chloride to chamber 11 is adjusted so as to minimize or prevent the existence of any unchanged hydrogen chloride in the discharged stream of the reaction products. The conversion of cupric oxychloride to cupric chloride is exothermic and the temperature of the solid reaction mass is increased in chamber 11 to a value usually near, but not much over 350° C., a temperature at which the oxychloride effects insignificant oxidation of the hydrocarbon and its chlorination products. This is considerably below the optimum temperature for the chlorination of methane or ethane over cupric chloride, and this cupric chloride reaction mass moves from chamber 11 into chamber 12 wherein it is heated by the combustion of such a fuel as natural gas or gasoline in the presence of an excess of air. From data as to the specific heats of cupric chloride and of the siliceous carrier, and from the combustion characteristics of the fuel employed, it is estimated that the combustion of 1 cu. ft. (gas or vapor) of most common hydrocarbon fuels in insulated chamber 12 should increase the temperature of about 20 lbs. of the reaction mass by about 100 centigrade degrees. The results obtained in actual practice bear out the validity of such calculations, and the fuel and air for combustion can be metered into chamber 12 at rates to effect a temperature increase of the cupric chloride reaction mass, suitably to a value up to 450° C. when chlorinating methane, before that mass moves downward into chamber 13. (Alternatively, combustion may be effected outside of chamber 12, and the hot gaseous products may be brought into contact with the cupric chloride in that chamber, though this method is less efficient than the preferred method suggested above.) In the chamber 13 the hydrocarbon, which it is desired to chlorinate, is passed upwardly through the cupric chloride bed at a rate to effect substantial chlorination and to reduce the copper chloride to the cuprous chloride condition. In methane chlorination, this may lower the temperature of the solid reaction mass to a value near 415° C. The chlorohydrocarbon, residual hydrocarbon, and hydrogen chloride pass out of chamber 13 and are conducted to chamber 11, where the hydrogen chloride is absorbed, as previously described. The cuprous chloride effluent from the bottom of chamber 13 is conveyed by air lift, bucket conveyor, screw conveyor or other convenient means to the top of chamber 10, completing the cycle, and while being so conveyed, it is cooled to the desired and practical initial temperature, commonly near 210° to 250° C. An air lift is an especially convenient means for maintaining circulation of the reaction mass, and has the advantage of providing a ready control of the rate of catalyst flow. The air flow is held constant while the catalyst flow is controlled by means of a valve. Simple maintenance of a constant pressure drop across the air lift assures a constant rate of movement of the reaction beds.

It should be understood that there are two points in the system at which it is desirable to have a specific temperature, and that the required temperatures differ according to the material being chlorinated. One critical point is the temperature of the solid reaction mass entering the chlorination chamber 13. When the rate of flow of hydrocarbon through chamber 13 is adjusted to effect substantially complete reduction of cupric to cuprous chloride, the exit temperature of the latter material depends upon the heat of reaction, the specific heat of the reaction mass, and related factors. The other important control point is in chamber 11, where the cupric oxychloride at the top and cupric chloride at the bottom must not be so hot as to oxidize or chlorinate significant amounts of the hydrocarbon and chlorohydrocarbons passing therethrough. Because of the differences which exist between the actual temperature at the bottom of chamber 13 and the desired temperature in chamber 11, the temperature of the cuprous chloride being fed to chamber 10 may also be varied by greater or smaller amounts of cooling in the air lift. Since the oxidation of cuprous chloride to cupric oxychloride in chamber 10 is exothermic, the cuprous chloride temperature entering that zone must be enough below the required temperature in chamber 11 to provide a margin of safety in over-all operations. The temperature rise in a given system may be adjusted to the convenience of the intended reaction by changes in the amount of copper salts on a given weight of carrier, or by changes in the rate of circulation of the reagents. Thus, a higher copper burden will favor greater temperature rises, as will decreased circulation rates, while less copper or higher circulation rates are reflected by lower temperature gradients. The difference between the safe temperature required in chamber 11 and the necessary chlorination temperature in chamber 13 is made up by the heat of combustion supplied to chamber 12.

Reference has been made in the foregoing description to a "solid reaction mass." In the method of operation employed in the present invention, the copper salts constituting the solid reagent are deposited on and throughout the pores of a particular type of carrier having a particle size mainly in the range which will pass through a 6 mesh sieve and rest on a 20 mesh sieve (U. S. sieve series). Such impregnated particles are small enough to flow readily by their own weight yet are large enough to resist any tendency of the countercurrent gas streams to cause turbulence in the reaction chambers at practical reaction velocities.

The preferred carrier is a diatomaceous earth, though porous clay or other inactive aluminous or argillaceous carriers may be used if they have the required inertness, porosity, and resistance to loss by attrition. The requirements for a highly satisfactory carrier include chemical inertness under the contemplated reaction conditions and certain relations between pore volume, pore diameter and surface area. It has been found that the most desirable carriers have a total pore volume of at least 0.5 cc. per gram, and that at least 80 per cent of this volume is in the form of macropores. The surface area is at least 1 square meter per gram, and the ratio of volume to surface (computed as radius of an assumed uniform circular cylinder having the total pore surface and total pore volume) is at least 1800 Angstroms. The carrier should also be resistant to losses by attrition during circulation through the system.

A satisfactory test for a carrier's degree of resistance to attrition consists in circulating a body of catalyst-impregnated particles of the carrier down through a small tower, by gravity, thence up an air lift to a cyclone dust separator and back through the gravity leg, at a constant rate and preferably at a temperature between 350° and 450° C. (though this is not too important in the test) for periods of 8 hours or more, and then emptying the test apparatus and screening the solids to determine the amount of "fines" which has been formed. The lower this value, the greater is the resistance to loss by attrition, and in an 8-hour test an amount of fines under 5 per cent is desirable. In the slower rates of circulation used in actual practice, a much lower attrition loss is experienced.

An especially desirable species of carrier is a permeable and porous form of diatomaceous earth sold by the Johns-Manville Corporation under the trade designation "C-22 brick." The pores in this material are of a diameter greater than the mean-free path of any of the reagent gases, so that when impregnated with the copper reagents, the effective surface is of much greater area than is represented merely by the external and roughly spherical surfaces of the carrier particles. When attempts are made to use some of the other presumably inert carriers, such as pumice, silica gel or activated alumina, each is found to be unsatisfactory for one reason or another. Thus, silica gel and activated alumina tend to promote destructive oxidation of the hydrocarbon to carbon dioxide, and pumice hinders oxidation of cuprous chloride to cupric oxychloride.

It is observed from the foregoing description that there exists in each of the successive reaction chambers, a specific temperature gradient appropriate to the reaction being conducted in that chamber. It is noted, also, that a corresponding composition gradient exists in the solid reaction mass present in each chamber. There is no necessity for the existence of compromise conditions or of any condition other than the optimum for the particular stage of the reaction carried out in each zone.

An advantage of the process as described with respect to the drawing lies not only in the complete control of temperatures appropriate to the reaction at each stage, but also, in the completeness with which the hydrogen chloride may be utilized in the oxychlorination reaction. The relative rates of flow of hydrocarbon feed to chamber 13 and of the cupric chloride reagent downwardly through that chamber are so adjusted that the reduction of cupric to cuprous chloride is substantially complete before the cuprous chloride is recycled to chamber 10. This usually requires the use of a slight excess of hydrocarbon in the feed to chamber 13. Consequently, the exit gases from this chamber contain not only the expected chlorinated hydrocarbon and hydrogen chloride, but also, unconverted hydrocarbon. When this mixture is fed into chamber 11, it encounters cupric oxychloride at a substantially lower temperature than that in chamber 13. This moderate temperature (320°–350° C.) minimizes the danger of oxidation of the reaction product formed in chamber 13. Another advantage of the relatively low temperature prevailing in chamber 11 arises from the negligible amount of hydrolysis of the chlorinated hydrocarbon which occurs as a result of the co-existence of such materials and water in that chamber. The cupric oxychloride present in chamber 11 serves to insure the recovery of chlorine values, both from the hydrogen chloride formed in chamber 13 and from that which may be produced as a result of any chlorination reaction occurring in chamber 11, though the temperatures in chamber 11 do not favor chlorination by cupric oychloride or by cupric chloride. Any surplus of cupric oxychloride over that required to effect the economy just noted is neutralized by the additional amount of hydrogen chloride introduced into chamber 11 from outside the system.

It should be understood that the drawing, to which reference has been made, is diagrammatic, and that, in practice, reagent gases are not feed to the reaction zones merely through openings in the walls of the respective chambers, but that efficient gas distribution may be had in each chamber through the use of a perforated distributor ring, as is well known in the art.

The materials of which the reaction vessels may be constructed are limited because of the corrosive character of the solid and gaseous reagents and the temperatures employed. Nickel may be used as the internal surface of the reaction vessels, and various types of non-porous ceramic materials are satisfactory. Sometimes nickel is used in those parts of the system in which the copper is present mostly as oxychloride, while ceramics are used where the copper mass is mainly cupric chloride.

The foregoing description has referred to the solid reaction mass as containing cuprous chloride, cupric chloride or cupric oxychloride at appropriate points in the system. It is to be understood that other materials may be present in addition to the named compounds of copper. Thus, it is often of advantage to mix a promoter or activator with the copper compounds carried on the siliceous support, to increase the efficiency or the rate of the chlorination reaction. Such promoters, which form no part of the present invention, may be the chlorides of other metals, such as potassium chloride, though it is to be understood that other types of promoters may be present when carrying out the present process.

When preparing to operate the method of the present invention, the inert carrier is screened to select for use the particles of the desired particle size. An amount of such particles is taken which will be sufficient to fill the apparatus to be used, and the carrier is wet with an aqueous solution of cupric chloride of a concentration to provide the desired copper burden on the carrier. When using the crushed "C–22" type of diatomaceous earth, having a density of about 360 grams per liter in the form of 6 to 20 mesh particles, it is convenient to employ 380 cc. of a cupric chloride solution containing 3.35 mols of copper salt per liter, for each liter of the carrier. When the carrier and copper chloride solution are stirred together, the resulting impregnated mass appears only slightly wet. It is then dried, suitably while maintained in the fluidized state in a strong air blast. The temperature of the air used for drying is gradually increased until the temperature of the dried mass reaches 250° C. The so-dried particles are used to fill the reaction system, and heat is applied in the chlorination zone (chamber 13) until the mass is at a reaction temperature, and the mass is then circulated slowly through the system, as described. Air and hydrogen chloride are introduced at the proper points, and hydrocarbon is fed to the chlorination zone. Balanced operating conditions are reached as soon as the entire charge of the solid reaction mass has passed once through the cyclic system.

The following examples illustrate the practice of the invention as applied to the chlorination of a variety of hydrocarbon feeds, but such examples are not to be construed as limiting the invention.

Example 1

Methane was chlorinated in the manner described above, using a moving bed of a solid reaction mass, originally consisting essentially of the "C–22" carrier of 6 to 20 mesh particle size, burdened with an equal weight of an equimolar mixture of cupric chloride and sodium chloride. The rate of flow of methane was adjusted to provide a contact time of 57 seconds between the methane and the cupric chloride in chamber 13, at an average temperature in that zone of 417° C. It was found that 42 per cent of the methane was chlorinated per pass, and that the chlorinated products consisted of:

| Compound | Mol Percent |
| --- | --- |
| Methyl chloride | 28 |
| Methylene chloride | 34 |
| Chloroform | 27 |
| Carbon tetrachloride | 11 |

In other runs carried out in like manner, the efficiency of utilization of hydrogen chloride was consistently greater than 90 per cent, and, at average chlorination temperatures near 420°–425° C. in chamber 13, the conversion of methane per pass was about 48 per cent and the product distribution, when 1 mol of hydrogen chloride was introduced into chamber 11 for each mol of methane fed to chamber 13, was commonly:

| Compound | Mol Percent |
| --- | --- |
| Methyl chloride | 31 |
| Methylene chloride | 46 |
| Chloroform | 17 |
| Carbon tetrachloride | 6 |

*Example 2*

Ethane was fed to chamber 13 while hydrogen chloride was introduced into chamber 11 at a ratio of 2 mols of HCl per mol of ethane. Various rates of feed were used, to provide the different contact times shown in the table, below, between the hydrocarbon and the cupric chloride-containing solid reaction mass. Average reaction temperature in the chlorination zone, as shown, was near 390°–395° C., and the amount of ethane chlorinated per pass varied directly with the contact time. All hydrogen chloride was absorbed in chamber 11, and the exit gases from the system were substantially free from this reagent. Typical analyses of the chlorinated products, obtained under typical reaction conditions, are listed below:

| | | |
| --- | --- | --- |
| Average temperature of cupric chloride, °C | 394 | 391 |
| Contact time between ethane and cupric chloride, seconds | 19 | 38 |
| Conversion of ethane to chlorinated products, per pass, percent | 39 | 52 |
| Product analysis, mol percent: | | |
| Dichloroethylenes | 19 | 21 |
| Ethylene chloride | 23 | 16 |
| Trichloroethylene | 9 | 9 |
| Trichloroethane | 3 | 3 |
| Perchloroethylene | 19 | 23 |
| Sym. tetrachloroethane | 26 | 28 |
| Pentachloroethane | 0 | 0 |

*Example 3*

When ethylene was substituted for the methane and ethane of the preceding examples, the reaction temperature in chamber 13 was lowered substantially to the range from 350°–360° C., and the amount of heat supplied to the reaction mass in chamber 12 could be reduced to about one-tenth of that needed for the methane reaction. When using 2 mols of hydrogen chloride per mol of ethylene, conversions of 80 per cent, or more, of the ethylene to chlorinated products were commonly obtained. Typical results appear below, together with the conditions under which they were observed:

Average temperature of cupric chloride, °C _____ 351
Contact time between ethylene and cupric chloride, seconds _____ 20
Conversion of ethylene to chlorinated products, per cent _____ 82
Product analysis, mol per cent:
    Vinyl chloride _____ 0
    Cis-dichloroethylene _____ 5.2
    Trans-dichloroethylene _____ 2.8
    Ethylene chloride _____ 66.9
    Trichloroethylene _____ 0.9
    Trichloroethane _____ 3.5
    Perchloroethylene _____ 0.3
    Sym. tetrachloroethane _____ 20.4
    Pentachloroethane _____ 0

*Example 4*

The method of the present invention may be used in the chlorination of benzene. Reaction temperature in the cupric chloride zone is advantageously in the range from 325° to 350° C., and, even with a large amount of cooling of the reaction mass in the air lift and a high rate of flow of the mass through the system, the minimum suggested temperatures are required in chambers 10 and 11, and only 5 to 15 per cent as much heat input is needed in chamber 12 as when chlorinating methane. When equimolar amounts of hydrogen chloride and benzene are fed to the system, the following results are typical:

Contact time in chamber 13, seconds _____ 24
Average reaction temperature, °C _____ 325
Conversion of benzene per pass, per cent _____ 54
Product analysis, mol per cent:
    Monochlorobenzene _____ 80.9
    o-Dichlorobenzene _____ 8.5
    p-Dichlorobenzene _____ 10.6
    Higher chlorobenzenes _____ 0

*Example 5*

In a manner similar to that described in Example 1, methane was chlorinated at 413° C. over a solid reaction mass consisting of 0.5 mol chromic chloride per mol of cupric chloride, supported on an equal weight of the "C-22" carrier. A little over one mol of hydrogen chloride was fed to chamber 11 for each mol of methane fed to chamber 13. The hydrogen chloride was entirely consumed in the reaction, and 48 per cent of the methane was converted to chlorinated products, whose analysis was:

| Compound | Mol Percent |
| --- | --- |
| Methyl chloride | 15 |
| Methylene chloride | 58 |
| Chloroform | 19 |
| Carbon tetrachloride | 8 |

In none of the reactions reported above was any significant amount of hydrolysis of the chlorinated products observed, and the moderate temperature in the oxychloride zone (chamber 11) was found to cause a minimum oxidation of those products, and recoveries of 93 to 98 per cent of the carbon values were normal.

The chlorinatable feed employed in the herein-described reaction need not be a hydrocarbon but may be a partially chlorinated hydrocarbon. Thus, the mono-, di- or trichloroethylenes, or mono-, di- or trichloromethane or the less than fully chlorinated chloroethanes or chloropropanes, when fed to the chlorination zone (chamber 13), are converted to more highly chlorinated products.

I claim:
1. The method which comprises establishing a moving bed of a solid reaction mass comprising an inert carrier and a chloride of copper, moving the entire said bed at a substantially uniform rate successively through a zone in which cuprous chloride is oxidized to cupric oxychloride, thence through another zone in which cupric oxychloride reacts with hydrogen chloride and is converted to cupric chloride, thence through another zone in which the temperature of the cupric chloride containing mass is increased by the heat of combustion of a volatile fuel, thence through a final zone in which the so-heated cupric chloride reacts with a volatile and chlorinatable feed material and is reduced to cuprous chloride, and finally returning the solid reaction mass at the same substantially uniform rate to the first said zone at a reduced temperature, while passing countercurrent to said moving bed the chlorinatable feed, initially consisting of a mate- rial selected from the group consisting of the readily volatile hydrocarbons and their volatile and less than fully chlorinated chlorine reaction products, at a rate to avoid solids turbulence in the reaction zones and to reduce the cupric chloride in the said final and hottest zone to cuprous chloride, the volatile reaction products from said hottest zone being then conveyed around the combustion zone and introduced with added hydrogen chloride to the zone in which cupric oxychloride is converted to cupric chloride, the amount of added hydrogen chloride being just sufficient to complete said conversion and being insufficient to provide any significant amount of hydrogen chloride in the effluent from said zone; and recovering chlorinated hydrocarbon from the said effluent; the conversion of cuprous chloride to cupric oxychloride in the first said zone being effected by passing air continuously through said zone.

2. The method which comprises establishing a moving bed of a solid reaction mass comprising an inert carrier and a chloride of copper, said carrier having an average particle size of at least 20 mesh, a total pore volume of at least 0.5 cubic centimeter per gram, at least 80 per cent of the pore volume being macropores, a surface area of at least 1 square meter per gram, and having a ratio of pore volume to surface area, expressed as the radius of an assumed uniform circular cylinder having the total pore volume and total pore surface, of at least 1800 Angstroms; moving the entire said bed at a substantially uniform rate successively through a zone in which cuprous chloride is oxidized to cupric oxychloride, thence through another zone in which cupric oxychloride reacts with hydrogen chloride and is converted to cupric chloride, thence through another zone in which the temperature of the cupric chloride containing mass is increased by the heat of combustion of a volatile fuel being burned in said zone, thence through a final zone in which the so-heated cupric chloride reacts with a volatile and chlorinatable feed material and is reduced to cuprous chloride, and finally returning the solid reaction mass at the same substantially uniform rate to the first said zone at a reduced temperature, while passing countercurrent to said moving bed the chlorinatable feed, initially consisting of a material selected from the group consisting of the readily volatile hydrocarbons and their volatile and less than fully chlorinated chlorine reaction products, at a rate to avoid solids turbulence in the reaction zones and to reduce the cupric chloride in the said final and hottest zone to cuprous chloride, the volatile reaction products from said hottest zone being then conveyed around the combustion zone and introduced with added hydrogen chloride to the zone in which cupric oxychloride is converted to cupric chloride, the amount of added hydrogen chloride being just sufficient to complete said conversion and being insufficient to provide any significant amount of hydrogen chloride in the effluent from said zone; and recovering chlorinated hydrocarbon from the said effluent; the conversion of cuprous chloride to cupric oxychloride in the first said zone being effected by passing air continuously through said zone.

3. The method which comprises establishing a moving bed of a solid reaction mass comprising a diatomaceous earth as an inert carrier and a chloride of copper, said carrier having an average particle size of at least 20 mesh, a total pore volume of at least 0.5 cubic centimeter per gram, at least 80 per cent of the pore volume being macropores, a surface area of at least 1 square meter per gram, and having a ratio of pore volume to surface area, expressed as the radius of an assumed uniform circular cylinder having the total pore volume and total pore surface, of at least 1800 Angstroms; moving the entire said bed at a substantially uniform rate successively through a zone in which cuprous chloride is oxidized to cupric oxychloride, thence through another zone in which cupric oxychloride reacts with hydrogen chloride and is converted to cupric chloride, thence through another zone in which the temperature of the cupric chloride containing mass is increased by the heat of combustion of a volatile fuel being burned in said zone, thence through a final zone in which the so-heated cupric chloride reacts with a volatile and chlorinatable feed material and is reduced to cuprous chloride, and finally returning the solid reaction mass at the same substantially uniform rate to the first said zone at a reduced temperature, while passing countercurrent to said moving bed the chlorinatable feed, initially consisting of a material selected from the group consisting of the readily volatile hydrocarbons and their volatile and less than fully chlorinated chlorine reaction products, at a rate to avoid solids turbulence in the reaction zones and to reduce the cupric chloride in the said final and hottest zone to cuprous chloride, the volatile reaction products from said hottest zone being then conveyed around the combustion zone and introduced with added hydrogen chloride to the zone in which cupric oxychloride is converted to cupric chloride, the amount of added hydrogen chloride being just sufficient to complete said conversion and being insufficient to provide any significant amount of hydrogen chloride in the effluent from said zone; and recovering chlorinated hydrocarbon from the said effluent; the conversion of cuprous chloride to cupric oxychloride in the first said zone being effected by passing air continuously through said zone.

4. The method which comprises establishing a moving bed of a solid reaction mass comprising a diatomaceous earth as an inert carrier and a chloride of copper, said carrier having an average particle size of at least 20 mesh, a total pore volume of at least 0.5 cubic centimeter per gram, at least 80 per cent of the pore volume being macropores, a surface area of at least 1 square meter per gram, and having a ratio of pore volume to surface area, expressed as the radius of an assumed uniform circular cylinder having the total pore volume and total pore surface, of at least 1800 Angstroms; moving the entire said bed at a substantially uniform rate successively through a zone in which cuprous chloride is oxidized to cupric oxychloride, thence through another zone in which cupric oxychloride reacts with hydrogen chloride and is converted to cupric chloride, thence through another zone in which the temperature of the cupric chloride containing mass is increased by the heat of combustion of a volatile fuel being burned in said zone, thence through a final zone in which the so-heated cupric chloride reacts with a volatile and chlorinatable feed material and is reduced to cuprous chloride, and finally returning the solid reaction mass at the same substantially uniform rate to the first said zone at a reduced temperature, while passing a volatile hydrocarbon countercurrent to said moving bed at a rate to avoid solids turbulence therein and to reduce the cupric chloride in the said final and hottest zone to cuprous chloride, the volatile reaction products from said hottest zone being then conveyed around the combustion zone and introduced with added hydrogen chloride to the zone in which cupric oxychloride is converted to cupric chloride, the amount of added hydrogen chloride being just sufficient to complete said conversion and being insufficient to provide any significant amount of hydrogen chloride in the effluent from said zone; and recovering chlorinated hydrocarbon from the said effluent; the conversion of cuprous chloride to cupric oxychloride in the first said zone being effected by passing air continuously through said zone.

5. The method as claimed in claim 4, wherein the hydrocarbon subjected to oxychlorination is methane, and the cupric chloride reaction mass is heated in the combustion zone to a temperature in the range from 400° to 450° C.

6. The method as claimed in claim 4, wherein the hydrocarbon subjected to oxychlorination is ethane and the cupric chloride reaction mass is heated in the combustion zone to a temperature near 350° to 360° C.

7. The method as claimed in claim 4, wherein the hydrocarbon subjected to oxychlorination is benzene and the cupric chloride reaction mass is heated in the combustion zone to a temperature near 325° to 350° C.

References Cited in the file of this patent

UNITED STATES PATENTS

| | | |
|---|---|---|
| 1,892,534 | Rembert | Dec. 27, 1932 |
| 2,407,828 | Gorin | Sept. 17, 1946 |
| 2,498,546 | Gorin | Feb. 21, 1950 |
| 2,575,167 | Fontana et al. | Nov. 13, 1951 |

FOREIGN PATENTS

| | | |
|---|---|---|
| 214,293 | Great Britain | Apr. 14, 1924 |
| 559,080 | Great Britain | Feb. 3, 1944 |
| 587,969 | Great Britain | May 9, 1947 |